G. S. FRANCE.
BALE-TIE.

No. 187,118. Patented Feb. 6, 1877.

UNITED STATES PATENT OFFICE.

GUSTUS S. FRANCE, OF WORCESTER, MASS., ASSIGNOR TO WASHBURN & MOEN MANUFACTURING COMPANY, OF SAME PLACE.

IMPROVEMENT IN BALE-TIES.

Specification forming part of Letters Patent No. 187,118, dated February 6, 1877; application filed November 6, 1876.

*To all whom it may concern:*

Be it known that I, GUSTUS S. FRANCE, now of the city and county of Worcester, and Commonwealth of Massachusetts, have invented certain new and useful Improvements in Bale-Ties; and I do hereby declare that the following is a full, clear, and exact description of the same, reference being had to the accompanying drawings, forming a part of this specification, and in which—

Figure 1:
Figure 2:
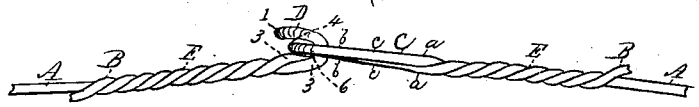

Figure 1 represents a top or plan view of so much of a wire bale-tie as is necessary to illustrate my present improvement in bale-ties. Fig. 2 represents a side view of the parts shown in Fig. 1.

To enable those skilled in the art to which my invention belongs to make and use the same, I will proceed to describe it more in detail.

In the drawings, the parts marked A represent the main part of the wire forming the bale-tie, and which wire is continuous from end to end, or is so made by preference. The ends B B' are bent in Fig. 1 to form loops C D, and are then carried back and twisted about the main wire, as shown at E E, whereby said ends B B' are prevented from drawing out of place when the tie is in use. Loop C is made with two inclines, *a b*, on each side, the central points *c* being extended the farthest, while loop D is made somewhat in the form of a horseshoe, the front part 1 being made rounding, and the sides being contracted toward each other, as shown at 2 2, which resemble the rear part of a horseshoe in form. The greatest width in cross-section of loop C is a little less than the greatest width in cross-section of loop D. Consequently, when loop C is passed over loop D in the act of baling it has to be canted sidewise a little; but after it is hooked into position, as shown in Fig. 1, it is not liable to slip off of its loop D, even when used in baling hay in continuous hay-presses, in which there is a constant pulsation until the bale is thrown from the press; but even though such pulsation is sufficient to allow the loop C to move forward more than half its length, it cannot slip off of loop D, since the width of loop D is greater than the width of the opening in loop C.

In use, the points 2 2 of loop D are drawn close together, thus bracing the rounded front part of the loop, and as the parts *c c* of loop C contract loop D is prevented from drawing out, while a sufficient surface is presented by the strands 3 3, which form the neck of loop D, to prevent cutting or breaking of the front end 4 of loop C.

It will be observed that the front part 6 of loop C is much narrower than at the center of the loop, and by this construction the loop C fits around and holds the strands forming the neck of loop D in a very perfect manner, while the under side of loop D rests upon the nose or elongated part 6 of loop C.

Having described my improvement in bale-ties, what I claim therein as new and of my invention, and desire to secure by Letters Patent, is—

As an improvement on the bale-tie patented to E. S. Lenox April 4, 1876, the horseshoe-shaped loop-hook D, made in the peculiar manner shown and described, whereby, when the tie is in use, the parts 2 2 will abut against each other, and thereby brace the part 1, as and for the purposes stated.

GUSTUS S. FRANCE.

Witnesses:
THOS. H. DODGE,
EDWIN E. MOORE.